United States Patent Office 3,792,156
Patented Feb. 12, 1974

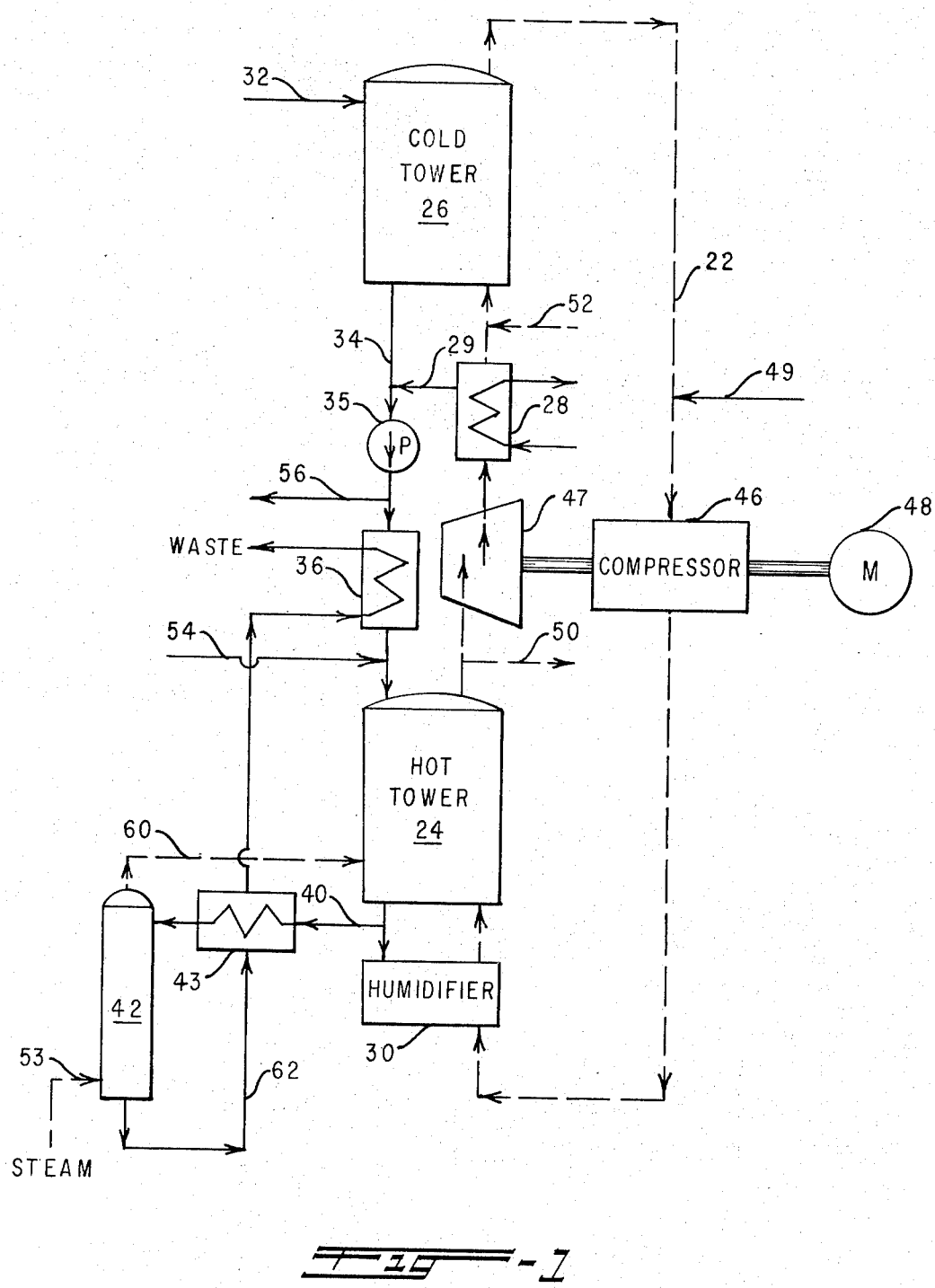

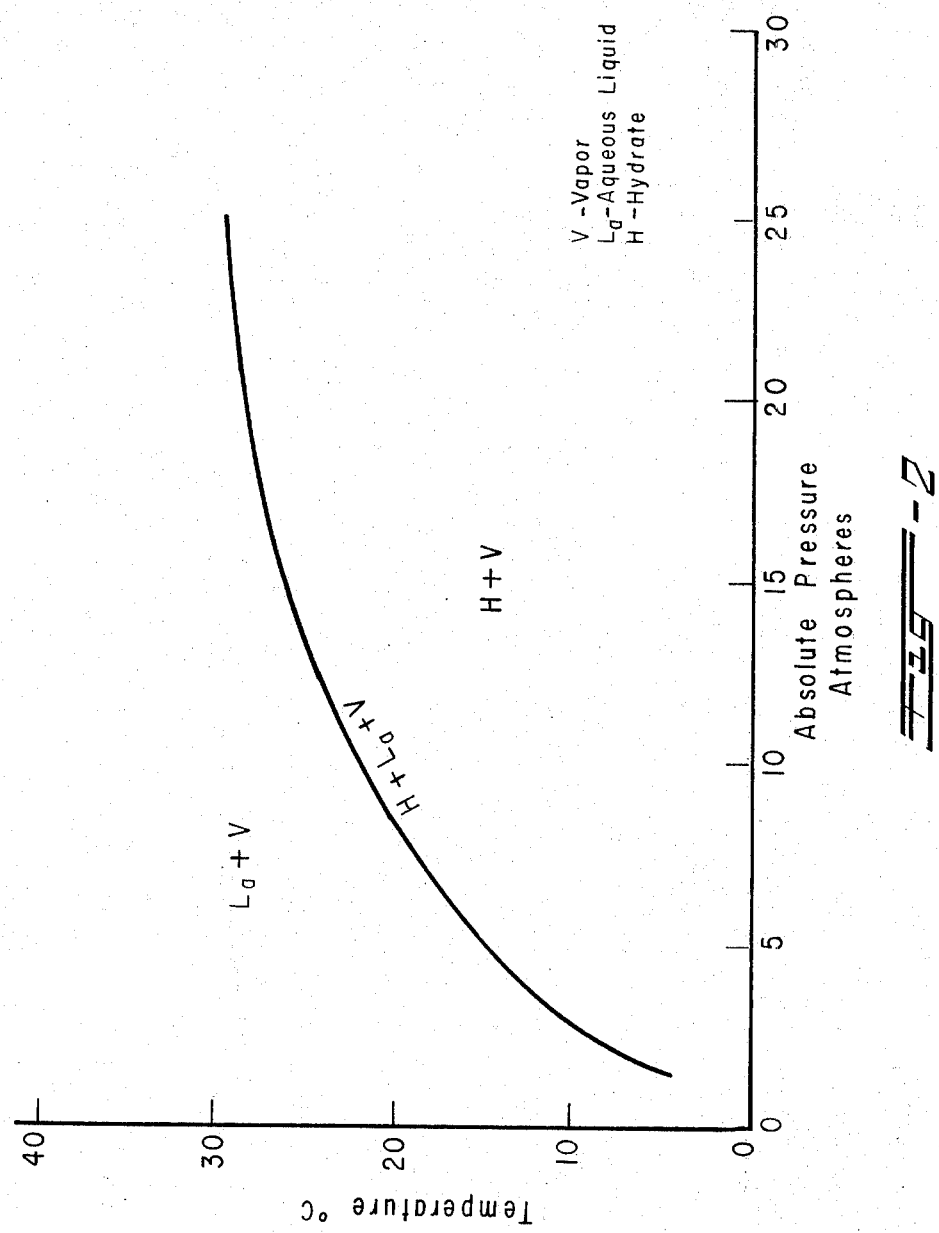

3,792,156
DUAL PRESSURE-DUAL TEMPERATURE ISOTOPE EXCHANGE PROCESS
Dale F. Babcock, Wilmington, Del., assignor to the United States of America as represented by the United States Atomic Energy Commission
Filed June 21, 1972, Ser. No. 265,059
Int. Cl. C01b 5/02, 17/16
U.S. Cl. 423—580                                    3 Claims

ABSTRACT OF THE DISCLOSURE

A liquid and a gas stream, each containing a desired isotope, flow countercurrently through two liquid-gas contacting towers maintained at different temperatures and pressures. The liquid is enriched in the isotope in one tower while the gas is enriched within the other and a portion of at least one of the enriched streams is withdrawn from the system for use or further enrichment. The tower operated at the lower temperature is also maintained at the lower pressure to prevent formation of solid solvates. Gas flow between the towers passes through an expander-compressor apparatus to recover work from the expansion of gas to the lower pressure and thereby compress the gas returning to the tower of higher pressure.

BACKGROUND OF THE INVENTION

The invention described herein was made in the course of, or under, a contract with the U.S. Atomic Energy Commission.

Field of the invention

This invention relates to an improvement in the dual-temperature isotope exchange process for concentrating an isotope of an element by its exchange between two substances at two temperatures. This process has been of major importance in the manufacture of heavy water.

In the breadth of application of the dual-temperature isotope exchange process to which the instant invention relates, a system is employed which comprises one or more stages of pairs of hot and cold liquid-gas contacting towers wherein two substances are made to flow in countercurrent relationship. One of the two substances is fed to the first stage of the system, enriched in the isotope to be concentrated by preferential isotope exchange in the first of the pair of towers of that stage, depleted in the isotope in the second tower to below the feed concentration and discharged from the system as waste. The other substance is continuously circulated through the system as the separating agent in an essentially closed recycle flow. At a point where the isotope concentration is high, a portion of the flow of one or both substances is withdrawn for further processing, as in another stage, and then returned, thereby effecting the net removal of relatively pure isotope. In the application of the process to the concentration of heavy water, the deuterium isotope is exchanged between water feed and continuously circulated hydrogen sulfide gas to attain concentration of the deuterium in the cold water and the hot hydrogen sulfide gas.

Heavy water, deuterium oxide ($D_2O$), is useful as a moderator for nuclear reactors. It has been most commonly obtained from natural water where the ratio of deuterium atoms to the total hydrogen atoms present is only about one part in 7,000 which corresponds to a concentration of about 0.0147 mole percent $D_2O$. This very dilute concentration and the similarities of the properties of $D_2O$ with $H_2O$ make heavy water expensive to produce. This is true even through produced, as at present, in commercial scale quantities of hundreds of tons per year.

Description of prior art

The principles governing the conventional, dual temperature isotope exchange process are explained in such references as U.S. Pat. No. 2,787,526 entitled "Method of Isotope Separation," issued Apr. 2, 1957 to J. S. Spevack, assignor to the U.S. Government; USAEC R&D Report DP–400 entitled "Production of Heavy Water—Savannah River and Dana Plant—Technical Manual," Du Pont Co., Aiken, S.C. (1959); and "Production of Heavy Water," by W. P. Bebbington and V. R. Thayer, Chemical Engineering Progress, vol. 55, No. 9, pp. 70–78 (September 1959). Recent improvements in the dual temperature process are disclosed in U.S. Pat. Nos. 3,549,323; 3,549,324; and 3,549,325; each patent is entitled "Improvement in Dual Temperature Isotope Exchange Process," and issued Dec. 22, 1970 to D. F. Babcock, assignor to the U.S. Government.

In the conventional dual temperature process for the recovery of deuterium oxide, water flows down through a cold tower and then through a hot tower in countercurrent relation to an upward flow of hydrogen sulfide gas. The water is progressively enriched in deuterium as it passes downward through the cold tower and progressively depleted in deuterium as it passes downward through the hot tower. Conversely, the hydrogen sulfide stream is enriched in deuterium as it passes upward through the hot tower and depleted in deuterium as it passes upward through the cold tower. Accordingly, the concentration of deuterium in each of the streams is maximum at the bottom of the cold tower and at the top of the hot tower, or figuratively speaking, between the towers. A portion of the enriched water and gas between the hot and cold towers is withdrawn for further processing to effect a net removal of relatively pure $D_2O$ product together with slightly depleted streams that are returned to the first stage. The depleted water from the first stage is discarded as waste and the hydrogen sulfide stream is continuously recycled as the separating agent.

The operating pressure for both the hot and cold towers in the conventional process has been about 20 atmospheres. At this pressure, $H_2O$ and $H_2S$ form a hydrate at about 29° C. Thus the lowest temperature at which the cold tower can be operated is about 30° C. Because the equilibrium constant for the isotope exchange reaction becomes more favorable at lower temperatures, it is economically attractive to operate at the lowest practical temperature. In current practice, temperatures lower than about 33° C. are avoided in order to prevent the formation of solid hydrate. In other applications of the dual temperature process involving various liquids and gases, the formation of other hydrates or solvates may likewise limit the lower operating temperature.

SUMMARY OF THE INVENTION

In view of the limitations of the prior art it is therefore an object of the present invention to increase the productivity of the dual temperature isotope exchange process.

It is a further object to provide a dual temperature isotope exchange process that can employ reduced temperatures in the cold contacting towers to enhance the concentration of the desired isotope within one of the two substances containing the isotope.

It is also an object to increase the productivity of such a process employed in the separation of deuterium from water by reducing the temperature of the cold contacting tower without incurring solid solvate formation.

In accordance with the present invention there is provided an improved dual temperature isotope exchange process for concentrating an isotope by its exchange between a countercurrent liquid and gas flow in a system including at least one pair of liquid-gas contacting towers miantained at different temperatures. The improvement in its broadest scope comprises operating the towers at substantially different internal pressures as well as at different temperatures. Another aspect employed to conserve the pressure related energy of the system includes expanding the gaseous substance leaving the tower of higher pressure through a turbine, reciprocal or other type engine for extracting mechanical work from the energy released in the expansion. The mechanical work so recovered is employed either directly or indirectly to compress the gaseous substance returning to the tower of higher pressure from the lower pressure tower. An auxiliary motor provides additional work input to balance losses and inefficiencies in the system.

In this improved process for concentrating deuterium in water, the cold tower is operated at a pressure below the pressure of the hot tower and below the pressure ordinarily employed in both towers of the conventional process. This reduction in pressure permits a reduction in operating temperature of the cold tower below the temperature at which hydrogen sulfide hydrate forms at the higher pressure. The relationship of temperature and pressure to hydrate formation is illustrated in FIG. 2 discussed below. At the lower operating temperature, the equilibrium of deuterium between liquid water and gaseous hydrogen sulfide shifts in preference toward the liquid water and consequently, the separation process becomes more productive. Higher productivity may appear either as an increase in product concentration or as an increase in the quantity of product.

It will be understood that although as a matter of convenience the invention is described herein in relation to the concentration of deuterium by its exchange between hydrogen sulfide and water, the invention has general application to the dual temperature isotope exchange process. This general application of the invention will be readily appreciated by those familiar with this process.

BRIEF DESCRIPTION OF THE DRAWINGS

The present invention is illustrated in the accompanying drawings wherein:

FIG. 1 is a schematic diagram showing the flows of water and hydrogen sulfide in accordance with the invention in an otherwise conventional dual temperature process.

FIG. 2 is a graph showing the formation temperature and pressure of solid hydrogen sulfide hydrate.

DESCRIPTION OF PREFERRED EMBODIMENTS

Referring to FIG. 1, the flow of the liquid water and hydrogen sulfide gas in accordance with the invention is illustrated in diagrammatic manner. For ease in understanding the flow of these substances, the heat recovery loops have been simplified. Conventional items such as liquid pumps, valves, etc., have been omitted from the drawings in instances where their use will be readily understood by those familiar with chemical engineering processes and their illustration is unnecessary for an understanding of the invention. While the drawing shows the flows of water and hydrogen sulfide according to the invention in the first stage of a plural stage dual temperature process arrangement, the invention is equally applicable for single or plural stage arrangements and to each stage thereof. From an economic standpoint a dual temperature process production facility for concentrating deuterium would most likely be a plurality stage arrangement. The liquid water flows are represented by solid lines and the hydrogen sulfide gas flows by conventional dashed lines throughout.

The basic equipment shown in the drawings and employed in the conventional dual temperature process include two liquid-gas contacting towers 24 and 26 operated at different temperatures, tower 26 being shown as the cold tower and tower 24 as the hot tower. The structure of the towers can be of any suitable design well known in the chemical engineering art. They include any suitable means such as packing material, contacting plates, etc., for enhancing contact between the liquid and gas flows. A smaller tower or column 42 used for stripping dissolved hydrogen sulfide from the waste water may be of similar type. Heat exchangers 28, 36, and 43 can be shell and tube or other conventional type exchangers that allow separation of the two streams shown flowing through them while the required heating or cooling operations are conducted. However, in some instances heat exchanger 28 can be of the direct contact type, perhaps physically incorporated within the cold tower, to cool the entering gas. A humidifier 30 can be a liquid-gas contacting tower portion and may be incorporated in the bottom of the hot tower 24.

The equipment added to the conventional duel temperature process for implementation of the present invention is illustrated in FIG. 1 as pump 35, expander 47, compresser 46, and an auxiliary motor 48. Pump 35 can be an ordinary centrifugal or positive displacement pump connected into the liquid discharge conduit 34 from cold tower 26. It should be capable of generating sufficient pressure to overcome the differential between the two towers. Expander 47 is shown symbolically as a turbine engine installed within the gas discharge flow from hot tower 24, but it can also be a piston or other type gas engine capable of converitng the energy released by an expanding gas to mechanical work. A compressor 46 is shown directly coupled to expander 47 and installed to receive the gas discharge from cold tower 26 in recycle conduit 22. As an alternative, an indirect power transmission such as one involving an electric generator and motor might also be employed between the expander and compressor. A suitable compressor 46 can be provided from commercially available equipment to increase the pressure of gas leaving the cold tower to the hot tower pressure. An auxiliary motor 48 is shown connected to a drive shaft engaging compressor 46 and is suitably sized to provide sufficient power to start the process and to compensate for losses and inefficiencies in the expander 47-compressor 46 combination.

In operating the process of FIG. 1, the usual feed water stream, after suitable preconditioning as may be required by equipment not shown, enters the top of cold tower 26 through conduit 32. As the water flows down the cold tower, it is sequentially contacted by a countercurrent flow of hydrogen sulfide gas. The water is continually enriched in deuterium as it proceeds downward through cold tower 26 due to the higher preference of the deuterium isotope to combine with oxygen than with sulfur at the cold tower temperature. By reducing the temperature of the cold tower below that ordinarily employed in the conventional process, this preference of the deuterium isotope for oxygen is enhanced. The enriched water leaves cold tower 26 through conduit 34 into pump 35 where the pressure differential between the hot and cold towers is overcome. The hot tower is maintained at about the same pressure as that used in the conventional deuterium concentration process, while the cold tower in the present method is operated at a substantially lower pressure to avoid solvate formation.

A portion of the enriched water leaving the cold tower is withdrawn through conduit 56 as product or as feed to a subsequent stage. The remaining water flow is heated to hot tower temperature within heat exchanger 36. The heated water can be combined with an additional water stream in conduit 54 from a subsequent stage. Where a plurality of stages are employed the water leaving the hot towers in the enriched stages can be returned to a preceding stage in this manner. The combined water flow enters the top of hot tower 24 and proceeds downwardly in countercurrent contact with the gaseous hydrogen sulfide flow. The liquid is thereby continuously depleted in deuterium content due to the relatively lower preference of the deuterium for the oxide form at the hot tower temperature. Water depleted in deuterium is discharged from the bottom of the hot tower through conduit 40, and heated in heat exchanger 43 before entering the top of stripping column 42. A flow of steam from conduit 58 is supplied to column 42 to strip dissolved hydrogen sulfide from the liquid. The steam and stripped hydrogen sulfide gas is returned to the hot tower through conduit 60. In this manner, additional heat can also be supplied to maintain the temperature of the hot tower. The hot liquid leaving stripper 42 in conduit 62 can be employed as a source of heat for heat exchangers 43 and 36, as shown, or for other purposes prior to its discharge to waste.

The gas flow proceeds in an essentially closed cycle through the hot and cold towers 24 and 26 and recycle conduit 22; however, a portion of hot gas can be withdrawn through conduit 50 and fed through the hot and cold towers of a subsequent stage before being returned through conduit 52 to the cold tower 26. As the gas proceeds upward through the hot tower 24 in countercurrent contact with the liquid water, it is enriched in deuterium due to the preference of deuterium for the sulfide form at the hot tower temperature. The gas leaves the top of the hot tower and enters expander 47 where it expands to the lower cold tower pressure and in so doing performs mechanical work such as driving compressor 46. Although the gas cools during the expansion, further cooling is provided by flow through heat exchanger 28, when necessary, to attain the cold tower temperature. Condensate is withdrawn from heat exchanger 28 through conduit 29 and combined with the enriched liquid flow in conduit 34. As the gas proceeds upward through the cold tower, it is depleted in deuterium by countercurrent contact with the liquid at the cold tower temperature.

The depleted gas leaving the top of cold tower 26 through conduit 22 is recompressed to hot tower pressure in compressor 46. The compression also heats the gas to approach the hot tower operating temperature with little additional heat input required. The compressed, hot gas is next passed through humidifier 30 where it is contacted with a portion of the waste water flow from conduit 40, as shown, or is mixed with steam such as from conduit 60 before reentering hot tower 24. A sufficient amount of hot water or steam can be supplied to humidifier 30 not only to humidify the gas but also to further increase its temperature, if required.

In addition to the humidification described above, liquid water can be added into the suction of compressor 46 as shown at conduit 49. The combined liquid and gaseous mixture is then compressed to the hot water pressure. The heat resulting from the compression does not entirely go to heating the gas, but a portion of its evaporates the water. Thus, the heated gas is at a lower temperature than would otherwise be obtained without the water addition and the gas is partially humidified. A possible savings in humidification load and compressor work can result from this manner of operation.

In FIG. 2, a portion of the phase diagram in the hydrogen sulfide-water system is shown to illustrate the minimum temperatures obtainable at various pressures without the formation of hydrate ($H_2S$—$6H_2O$). The diagram is an extension of a curve shown in DP–400, p. 89, cited hereinabove, with data from "Industrial and Engineering Chemistry," vol. 44, p. 2223, September 1952. The curve passes through those temperatures and pressures at which hydrate, aqueous liquid and vapor may exist in equilibrium. The area above the curve represents a region of aqueous liquid and vapor equilibrium; while the area below the curve represents the hydrate and vapor region. To avoid fouling of the process equipment with hydrate, it is necessary to operate the dual temperature process in the region above the curve.

In contrast to the conventional dual temperature process employed for deuterium enrichment, where both the hot and cold towers are operated at approximately the same pressure of about 20 atmospheres, the process of the present invention operates with the hot tower at about 20 atmospheres, but with a reduced cold tower pressure at about 15 atmospheres or below. The cold tower can thereby be operated at a temperature of less than the conventional operating temperature of about 30° C. without hydrate formation. This lower cold tower temperature increases the preference of deuterium for the oxide form over the sulfide form and thus increases the deuterium concentration in the enriched water discharged from the cold tower or allows a larger discharge of water at the same concentration. For example, by operating the cold tower at an average temperature of 20° C. and an average pressure of 7 atmospheres absolute, it is estimated that an increase in productivity of between about 10 and 15 percent could be attained.

In addition to the increased productivity, other savings from reduced heating and cooling loads will also be obtained through use of the present improvements. For instance, it will no longer be necessary to preheat the feed water entering conduit 32 to about 30° C. as is presently done in the conventional process. The gas leaving the hot tower at about 130° C. and 20 atmospheres pressure can be expanded in expander 47 to about 50° C. and about 7 atmospheres pressure before it is cooled to about 20° C. in heat exchanger 28. The cooling effect produced in this expansion will correspondingly decrease the load and required size of heat exchanger 28. The gas at about 7 atmospheres and 20° C. leaving the top of the cold tower is compressed to 20 atmospheres pressure and heated to about 120° C. in compressor 46 with most of the required work supplied by the expansion of the gas through expander 47. Losses and thermodynamic ineffiicency must be offset by additional work input through motor 48. However, a lesser amount of heat transfer equipment will be required to humidify the hot gas from the compressor than is required for this purpose in the conventional process.

It will be apparent that the present invention provides an improved dual temperature porcess having increased productivity at a reduced cold tower temperature. The cold tower temperature reduction is attained without formation of objectionable hydrates or other solid solvates due to an accompanying reduction in cold tower pressure. Other process savings are realized from the reduced heating and cooling loads required by operating the dual temperature isotope exchange process in accordance with the invention as described herein.

What is claimed is:

1. In a dual temperature isotope exchange process for concentrating deuterium isotope by its exchange between water and hydrogen sulfide gas in a pressurized system comprising at least one pair of hot and cold liquid-gas contacting towers through which said water and hydrogen sulfide gas are made to flow in countercurrent relationship and wherein the pressure is maintained above atmospheric pressure, the improvement which comprises operating the cold tower of said pair at a pressure of at least 5 atmospheres below the pressure of the corresponding hot tower within said pair of towers and simultaneously operating said cold tower at a temperature below the temperature at which solid hydrogen sulfide hydrate forms at the pressure of said hot tower.

2. The method of claim 1 wherein said improvement includes the additional steps of expanding the hydrogen sulfide gas leaving said hot tower to said cold tower pressure within an expander means adapted to extract mechanical work from said expansion, and utilizing said mechanical work to compress said hydrogen sulfide gas leaving said cold tower to the pressure of said hot tower.

3. The method of claim 2 wherein liquid water is added to said hydrogen sulfide gas leaving said cold tower and the combined water-hydrogen sulfide mixture is compressed to the pressure of said hot tower.

References Cited
UNITED STATES PATENTS

| | | | |
|---|---|---|---|
| 2,895,803 | 7/1959 | Spevack | 423—580 |
| 2,908,554 | 10/1959 | Hoogschagen | 423—580 |
| 3,549,323 | 12/1970 | Babcock | 423—580 |

EDWARD J. MEBOS, Primary Examiner

H. S. MILLER, Assistant Examiner

U.S. Cl. X.R.

62—38; 423—563